United States Patent [19]

Haraikawa

[11] 4,022,299
[45] May 10, 1977

[54] ADJUSTING DEVICE FOR A MECHANICALLY OPERATED DISC BRAKE

[75] Inventor: Tetsuo Haraikawa, Funabashi, Japan

[73] Assignee: Tokico Ltd., Kanagawa, Japan

[22] Filed: Feb. 12, 1976

[21] Appl. No.: 657,623

[30] Foreign Application Priority Data

Feb. 17, 1975 Japan .............................. 50-19627
Feb. 18, 1975 Japan .............................. 50-19997

[52] U.S. Cl. ........................ 188/71.9; 188/196 BA
[51] Int. Cl.² ................ F16D 65/56; F16D 55/224
[58] Field of Search .............. 188/71.7, 71.8, 71.9, 188/72.7, 72.8, 196 M, 196 BA; 192/111 R, 111 A, 111 B

[56] References Cited

UNITED STATES PATENTS

| 2,669,327 | 2/1954 | Chamberlain et al. | 188/196 BA |
| 3,321,049 | 5/1967 | Swift | 188/71.9 |
| 3,321,050 | 5/1967 | Press | 188/71.9 |
| 3,365,031 | 1/1968 | Swift | 188/71.9 |
| 3,765,511 | 10/1973 | Toyomasu | 188/72.7 |
| 3,920,102 | 11/1975 | Ito | 188/71.9 |
| 3,952,844 | 4/1976 | Newstead et al. | 188/72.8 |
| 3,954,160 | 5/1976 | Carr | 188/72.7 |

Primary Examiner—Trygve M. Blix
Assistant Examiner—Edward R. Kazenske
Attorney, Agent, or Firm—Wenderoth, Lind & Ponack

[57] ABSTRACT

A mechanical type disc brake includes a calliper slidably supported in the axial direction of a disc and straddling a peripheral portion of the disc, a stationary pad secured to the calliper for engaging with one surface of the disc, a movable pad disposed opposite to the stationary pad and being slidably mounted only in the axial direction, a nut member mounted in the calliper and adapted to be rotated by means of a brake arm, an adjusting bolt threadingly extending through the nut member, with one end thereof abutting the movable pad for urging it against the disc, a mechanism for converting the rotation of the nut member into the axial movement thereof, and a rotation control member mounted on the movable pad for cooperating with the adjusting bolt for controlling the relative rotation between the adjusting bolt and the movable pad.

5 Claims, 7 Drawing Figures

ADJUSTING DEVICE FOR A MECHANICALLY OPERATED DISC BRAKE

BACKGROUND OF THE INVENTION

This invention relates to a mechanical type disc brake in which an input force given by a cable and the like in the circumferential direction of a disc is converted into an axial force for urging a friction pad against the disc.

In general, it has been a common practice to build in the disc brake of the type described a brake clearance adjusting means for adjusting to a given range the brake clearance between the disc and the friction pad. However, the brake clearance adjusting means hithertofore proposed is complex in construction and consists of a great number of parts, so that the size of the disc brake, when such means is built therein, will be increased, resulting difficulty in handling and an increase in cost.

SUMMARY OF THE INVENTION

One of the objects of the present invention is to provide simple, effective and economical brake clearance adjusting means adapted for use in the above mentioned type disc brake.

According to the present invention, there is provided a mechanical type disc brake comprising a calliper slidably supported in the axial direction of a disc and straddling a peripheral portion of the disc, a stationary pad secured to the calliper for engaging with one surface of the disc, a movable pad disposed opposite to the stationary pad and being slidably mounted only in the axial direction, a nut member mounted in the calliper and adapted to be rotated by means of a brake arm, an adjusting bolt threadingly extending through the nut member, with one end thereof abutting the movable pad for urging it against the disc, a mechanism for converting the rotation of the nut member into the axial movement thereof, and a rotation control member mounted on the movable pad for cooperating with the adjusting bolt for controlling the relative rotation between the adjusting bolt and the movable pad.

The rotation control member may be a resilient member mounted on the backing plate of the movable pad, and which cooperates with a portion of the adjusting bolt having a hexagonal cross-section such that the resilient member engages with one side of the hexagon and prevents the rotation of the adjusting bolt over a predetermined angle, e.g. 30°, from the neutral position.

The brake clearance can be adjusted by turning the adjusting bolt manually and, to this end, it is preferable to form a tool receiving recess in the adjusting bolt at the end thereof remote from the movable pad.

Another object of the present invention is to provide a disc brake having an automatic brake clearance adjusting function, which is attained by modifying the rotation control member so as to act as a pawl or a ratchet cooperating with a ratchet or pawl formed or mounted to the adjusting bolt.

BRIEF DESCRIPTION OF THE INVENTION

The specific features of the present invention will be apparent from a reading of the ensuring part of the specification in conjunction with the accompanying drawings, in which:

FIG. 1 is a longitudinal cross-sectional view of a mechanical type disc brake exemplifying the present invention, FIG. 2 is a cross-sectional view taken along the line X—X of FIG. 1, FIG. 3 is a cross-sectional view taken along the line Y—Y of FIG. 1, FIG. 4 is a longitudinal cross-sectional view of an essential portion of the disc brake of a second embodiment of the invention, FIG. 5 is a partial cross-section view taken along the line Y'—Y' of FIG. 4, FIG. 6 is an enlarged view showing the portion C in FIG. 5, and FIG. 7 is a modified form of the rotation limiting member of the second embodiment.

DETAILED DESCRIPTION OF THE INVENTION

Figure 1:
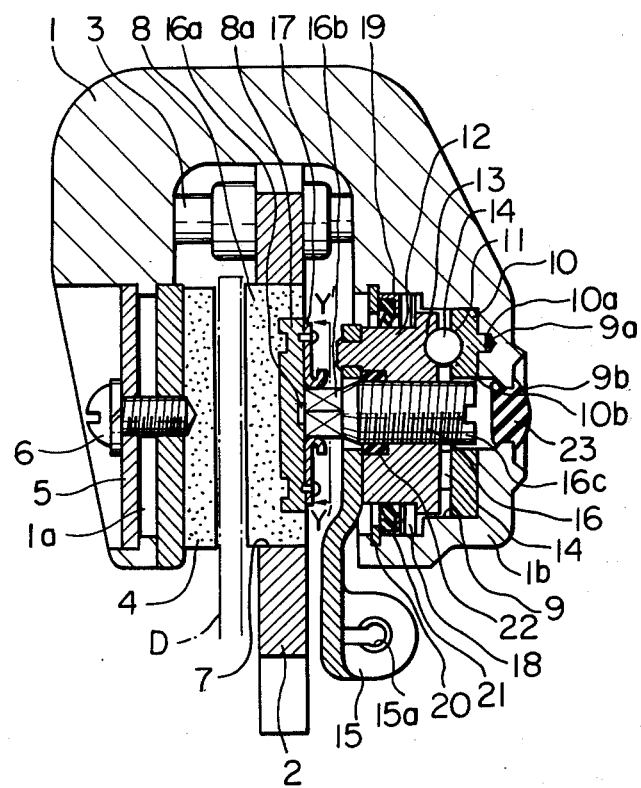

In the drawings, shown at 1 is a calliper of generally C-shaped configuration with leg portions 1a and 1b extending along the opposite surfaces of a disc D. The calliper 1 is supported on a supporting member 2, which is secured non-rotatably to a body of a vehicle, in a manner to slidingly move in the axial direction of the disc, by means of two bolts 3 (one of which is omitted in FIG. 1). A stationary pad 4 is secured to the leg portion 1a of the calliper 1 by means of a mounting plate 5 and a screw 6.

A hole 7 is formed in the supporting member 2 for receiving a movable pad 8 which is slidable in the axial direction. The movable pad 8 is oppositely disposed relative to the stationary pad 4 and has a configuration of a circle with the upper (radially outer) portion and the lower portion thereof cut off, and the hole 7 is complementary shaped so that the rotation of the movable pad 8 in the hole 7 is prevented.

A cavity 9 having different diameter portions or a stepped configuration is formed in another leg portion 1b of the calliper 1. Disposed within the cavity 9 is a ramp member 10 having a projection 10a which is fitted in a small recess 9a formed in the end wall of the cavity 9 for preventing rotation of the ramp member 10 within the cavity 9. In the surface of the ramp member 10 on the side opposite to the aforesaid end wall of the cavity 9, there are provided three circumferentially spaced inclined grooves 11, one of which is shown in FIG. 2 which is a cross-sectional view taken along the line X—X in FIG. 1.

Figure 2:
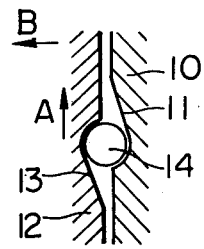

Shown at 12 is a nut member disposed adjacent to the ramp member 10 having three circumferentially spaced inclined grooves 13 in the surface opposing the ramp member 10, as shown in FIG. 2. Each of the inclined grooves 13 has a sloped portion extending generally in parallel with a sloped portion of a respective of the grooves 11. Interposed between the grooves 11 and 13 are three balls 14, one each for each pair of inclined grooves 11 and 13. Normally, the balls 14 are positioned at the deepest portions of the grooves 11 and 13, but when the nut member 12 is rotated relative to the ramp member 10 in the direction of arrow A in FIG. 2, the balls 14 ride up the inclined surface portions of the grooves 11 and 13 and the nut member 12 is separated from the ramp member in the direction of arrow B in FIG. 2.

Figure 3:
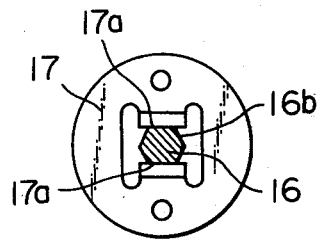

A brake arm 15 is secured to the nut member 12, and a cable or the like (not shown) is connected to a hole 15a provided in the brake arm 15. Thus, the nut member 12 is rotated upon braking action. Shown at 16 is an adjusting bolt, with a male thread portion formed thereon being in meshing relation to a female thread portion provided in the nut member 12. One end 16a of the adjusting bolt 16 is supported by a backing plate 8a of the movable pad 8. Adjacent to the end 16a, a hexagonal cross-section portion 16b is formed on the adjusting bolt 16 as shown in FIG. 3. Secured to the backing plate 8a of the movable pad by means of pins is a rotation controlling member 17 for cooperating with the hexagonal portion 16b of the adjusting bolt 16. As shown in FIGS. 1 and 3, the rotation controlling member 17 is formed by punching and press-forming a steel plate or the like. A hole for passing through the hexagonal portion 16b of the adjusting bolt 16 is formed in the member 17 and opposed inner edges of the hole define locking or engaging portions 17a which are adapted to engage with two opposite surfaces of the hexagonal portion 16b thereby controlling the rotation of the adjusting bolt 16.

On the other hand, the other end 16c of the adjusting bolt 16 extends into a hole 10b provided in the ramp member 10, and is accessible from outside of the calliper through an access hole 9b in the leg portion 1b.

Shown at 18 is a spring washer, which is retained in position by means of a retainer 19 and a retaining ring 20. The spring washer 18 engages with a stepped portion of the nut member 12 so as to urge the nut member 12 towards the ramp member 10. Shown at 21 and 22 are seals and at 23 is a rubber plug, which prevent ingress of water, mud and the like from the outside.

In operation, when a driver of the vehicle depresses a brake pedal or pulls a brake lever, a cable associated therewith is pulled so as to apply a torque on the brake arm 15 which, in turn, rotates the nut member 12 in the direction of arrow A as shown in FIG. 2. The inclined grooves 13 and 11 and the balls 14 act to convert the torque applied to the nut member 12 into a thrust and move the nut member 12 axially in the direction of arrow B. The axial movement of the nut member is transmitted through the adjusting bolt 16 to the movable pad 8, thereby urging the pad 8 against the disc D.

At this time, the adjusting bolt 16 is maintained in threading engagement with the nut member 12, while the rotation of the adjusting bolt 16 is normally prevented by means of the rotation control member 17. As a result, the rotation of the nut member 12 will not cause rotation of the adjusting bolt 16 in the initial stage. But, when the nut member 12 is turned to a further extent so that the movable pad abuts with the disc D to transmit the thrust, then the calliper 1 will slidingly move on the supporting member 2 according to a reaction force created thereby, so as to urge the stationary pad 4 against the opposite surface of the disc D, therby effecting a braking action.

At this stage, a large thrust is exerted on the adjusting bolt 16, thus increasing the frictional force between the nut member 12 and the adjusting bolt 16, with the result that the adjusting bolt 16 will rotate jointly with the nut member 12. However, the rotation angle of the nut member 12 which is required for obtaining an ample braking force, after such a thrust has been applied to the adjusting bolt 16 is as small as 5° – 10°, in general. This range, however, is not inconsistent with the acceptable engagement of the rotation control member 17 with the two opposite surfaces of the hexagonal portion 16b of the adjusting bolt 16. As a result, when the cable is released for releasing the brake, then the brake arm 15, jointly with the nut member 12, will be rotated in a reverse direction, by means of a return spring (not shown), so that the nut member 12 is urged by means of the spring washer 18 to return to its original position shown, while the adjusting bolt 16 will return to its original position assumed prior to the actuation of the brake. In this respect, the position relationship in the circumferential direction between the adjusting bolt 16 and the rotation control member 17 will be maintained unchanged.

In case the stationary pad 4 and movable pad 8 become worn, resulting in an increase in the rotating stroke of the arm 15, then the dust cover 23 is removed to make access to the adjusting bolt 16 for turning the adjusting bolt 16 so as to move forth, thereby adjusting the gaps between the pads 4, 8 and disc D.

Meanwhile, with this embodiment, the engaging portion of the adjusting bolt 16 with the rotation control member 17 is hexagonal in its cross section. However, the present invention is by no means limited to this configuration, and thus the aforesaid engaging portion may be octagonal or of other shapes, as long as the adjusting bolt 16 may be returned to its original position assumed prior to the actuation of the brake, when the adjusting bolt 16 rotates with the nut member 12. In addition, the movable pad is supported on the supporting member, but may be supported on the calliper itself.

Figure 4:
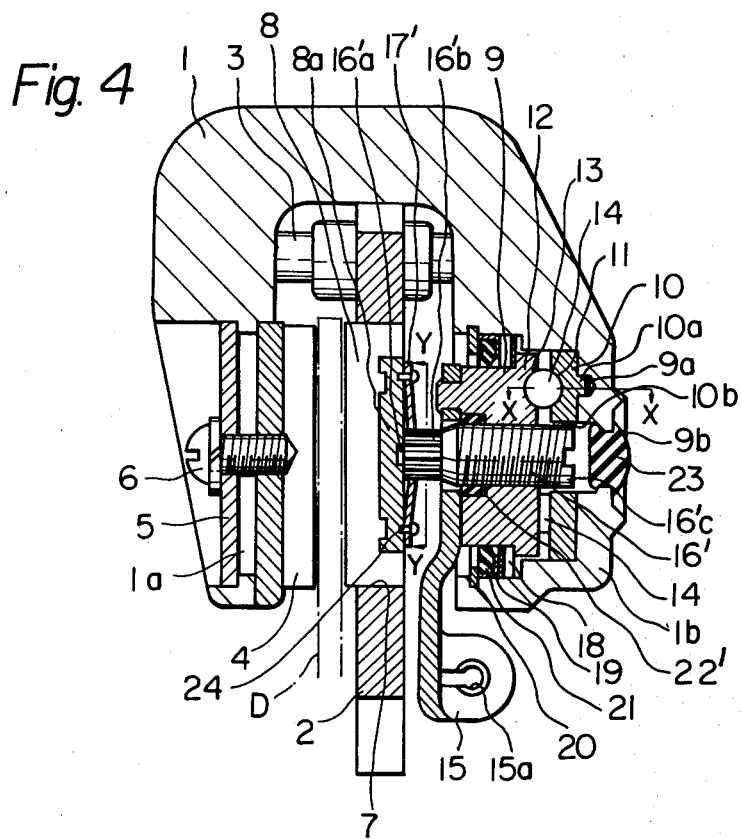

FIG. 4 shows a second embodiment of the present invention, in which, the rotation control mechanism 17, 16b for the adjusting bolt 16 of the first embodiment is replaced by a mechanism for attaining automatic brake clearance adjustment. The construction of this embodiment is otherwise the same as that of the first embodiment and corresponding reference numerals have been given to corresponding parts.

Figure 5:
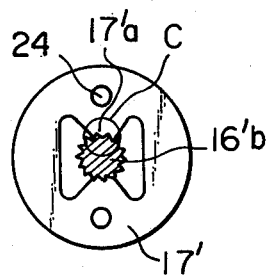
Figure 6:
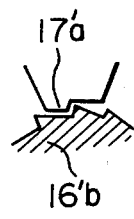

Shown at 16' is an adjusting bolt having a ratchet teethed portion 16'b as shown in FIGS. 5 and 6. A rotation control member 17' is secured to the backing plate 8a and has locking or engaging portions 17'a which act as pawls cooperating with the ratchet teeth portion of the adjusting bolt 16' so as to restrict the rotation of the adjusting bolt 16' in one direction only, namely, in such direction that the adjusting bolt 16' is moved out from the nut member 12 so as to compensate for wear of the pads 4 and 8.

In this embodiment, the seal ring 22' disposed between the nut member 12 and the adjusting bolt 16' acts to apply suitable resistance therebetween when the nut member 12 is rotated upon actuation of the brake.

Similarly to the first embodiment, the adjusting bolt 16' is rotated by the frictional resistance of the screw thread engagement with the nut member 12 in the last stage of brake application.

Normally, the range of rotation of the adjusting bolt 16' during brake application is within the range of one tooth of the ratchet teeth 16'b, and the pawls 17'a will not ride over the ratchet teeth 16'b. But, in case the pads 4 and 8 become worn, resulting in an increase in the rotating range of the adjusting bolt 16' during brake application, the pawl will ride over one tooth of the ratchet teeth 16'b thus effecting automatic brake clearance adjustment.

Figure 7:
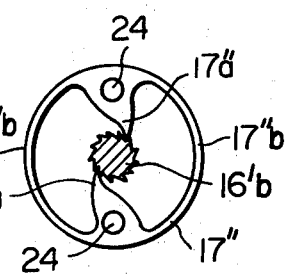

FIG. 7 shows a modified form of the rotation control member 17' of the second embodiment, in which, a generally flat rotation control member 17" having two pawl portions 17"a cooperates with the ratchet teeth portion 16'b of the adjusting bolt 16'. The member 17" is movably connected to the backing plate 8a of the movable pad 8 by pins 24, and the pawl portions 17"a are connected with each other by relatively thin walls 17"b. Thus, in this embodiment, the member 17" deforms in the plane of the plate or in the circumferential direction when the pawl portions 17"a ride over the ratchet teeth.

In the second and the third embodiments, the ratchet teeth are formed on the adjusting bolt and the pawl cooperating with the ratchet teeth is mounted on the movable pad, but it will be noted that it is possible to form the ratchet teeth on the movable pad and the pawl on the adjusting bolt, for restricting the rotation of the adjusting bolt in one direction only.

Further, the movable pad 8 may be mounted on the leg portion 1b of the calliper 1.

As is apparent from the foregoing description of the construction and operation of the mechanical type disc brake according to the present invention, the rotation control means for the adjusting bolt, is not positioned within the calliper as in the prior art, but in the pad which is adapted to be displaced by the adjusting bolt in the axial direction, thereby simplifying the construction of the brake clearance adjusting means, while shortening the axial length of the disc brake itself, thus allowing easy attachment of the disc brake which presents a lowered manufacturing cost. Further, an automatic brake clearance control means can be easily incorporated.

I claim:
1. A mechanical type disc brake comprising:
   a calliper slidably supported in the axial direction of a disc and straddling a peripheral portion of said disc;
   a stationary pad secured to said calliper for engaging with one surface of said disc;
   a movable pad disposed opposite to said stationary pad and being mounted for sliding movement in the axial direction only for engaging a second surface of said disc;
   a nut member mounted in said calliper and adapted to be rotated by means of a brake arm;
   an adjusting bolt threadingly extending through said nut member, a first end of said adjusting bolt having a polygonal cross-section and abutting said movable pad for urging said movable pad against said second surface of said disc, said adjusting bolt being rotatable relative to said movable pad;
   means for converting the rotation of said nut member into axial movement thereof; and
   a rotation control member being formed of a resilient material and secured to a backing plate of said movable pad for engaging with at least one side of said polygonal cross-section of said adjusting bolt for controlling relative rotation between said adjusting bolt and said movable pad.

2. A mechanical type disc brake as claimed in claim 1, wherein said rotation control member comprises a resilient plate with an opening defining two engaging portions for engaging with two opposite sides of said polygonal cross-section and allowing the rotation of said adjusting bolt for a predetermined range.

3. A mechanical type disc brake as claimed in claim 1, wherein a tool receiving recess is formed in a second end of said adjusting bolt, said recess being accessible from the exterior of said calliper through a normally closed opening in said calliper.

4. A mechanical type disc brake comprising:
   a calliper slidably supported in the axial direction of a disc and straddling a peripheral portion of said disc;
   a stationary pad secured to said calliper for engaging with one surface of said disc;
   a movable pad disposed opposite to said stationary pad and being mounted for sliding movement in the axial direction only for engaging a second surface of said disc;
   a nut member mounted in said calliper and adapted to be rotated by means of a brake arm;
   an adjusting bolt threadingly extending through said nut member, a first end of said adjusting bolt directly abutting with said movable pad for urging said movable pad against said second surface of said disc;
   means for converting the rotation of said nut member into axial movement thereof; and
   pawl and ratchet means, disposed between said first end of said adjusting bolt and said movable pad, said pawl and ratchet means comprising ratchet teeth formed in said first end of said adjusting bolt, an annular resilient washer secured to a backing plate of said movable pad, and at least one pawl cooperating with said ratchet teeth and formed in an inner circumference of said washer, for allowing rotation of said adjusting bolt relative to said nut member only in a direction of said adjusting bolt moving outwardly of said nut member toward said disc.

5. A mechanical type disc brake as claimed in claim 4, wherein said ratchet teeth are formed in the outer periphery of said first end of said adjusting bolt, said washer is mounted on said backing plate of said movable pad by means of two pins, and two pawls cooperate with said ratchet teeth.

* * * * *